United States Patent [19]

Scarlett et al.

[11] 4,234,169
[45] Nov. 18, 1980

[54] APPARATUS FOR THE DIRECT REDUCTION OF IRON AND PRODUCTION OF FUEL GAS USING GAS FROM COAL

[75] Inventors: John C. Scarlett, Toledo, Ohio; Donald Beggs, Charlotte, N.C.

[73] Assignee: Midrex Corporation, Charlotte, N.C.

[21] Appl. No.: 78,537

[22] Filed: Sep. 24, 1979

Related U.S. Application Data

[60] Division of Ser. No. 967,348, Dec. 7, 1978, which is a continuation-in-part of Ser. No. 933,690, Aug. 15, 1978.

[51] Int. Cl.³ .............................................. F27B 1/08
[52] U.S. Cl. ................................... 266/156; 266/197
[58] Field of Search ............................... 266/156, 197

[56] References Cited

U.S. PATENT DOCUMENTS 4,062,529  12/1977  Altenhoner et al. ................ 266/156
4,098,496  7/1978  Lange ................................... 266/156

Primary Examiner—M. J. Andrews
Attorney, Agent, or Firm—Ralph H. Dougherty

[57] ABSTRACT

Apparatus for the direct reduction of iron and production of fuel gas in which a fossil fuel is gasified to produce a hot gas which is tempered with a carbon dioxide rich gas. The mixture is reacted with carbon to upgrade it in reducing potential and is desulfurized by reaction with lime in a first shaft furnace to form a hot reducing gas. The hot reducing gas is utilized as the reductant in a counterflow shaft reduction furnace, a minor portion of the spent reducing gas is recycled as tempering gas for the gas from the hot gasifier, and the major portion of spent reducing gas becomes a source of fuel gas. The apparatus includes a gasifier, counterflow shaft gas reactor, a shaft type direct reduction furnace and associated equipment.

4 Claims, 1 Drawing Figure

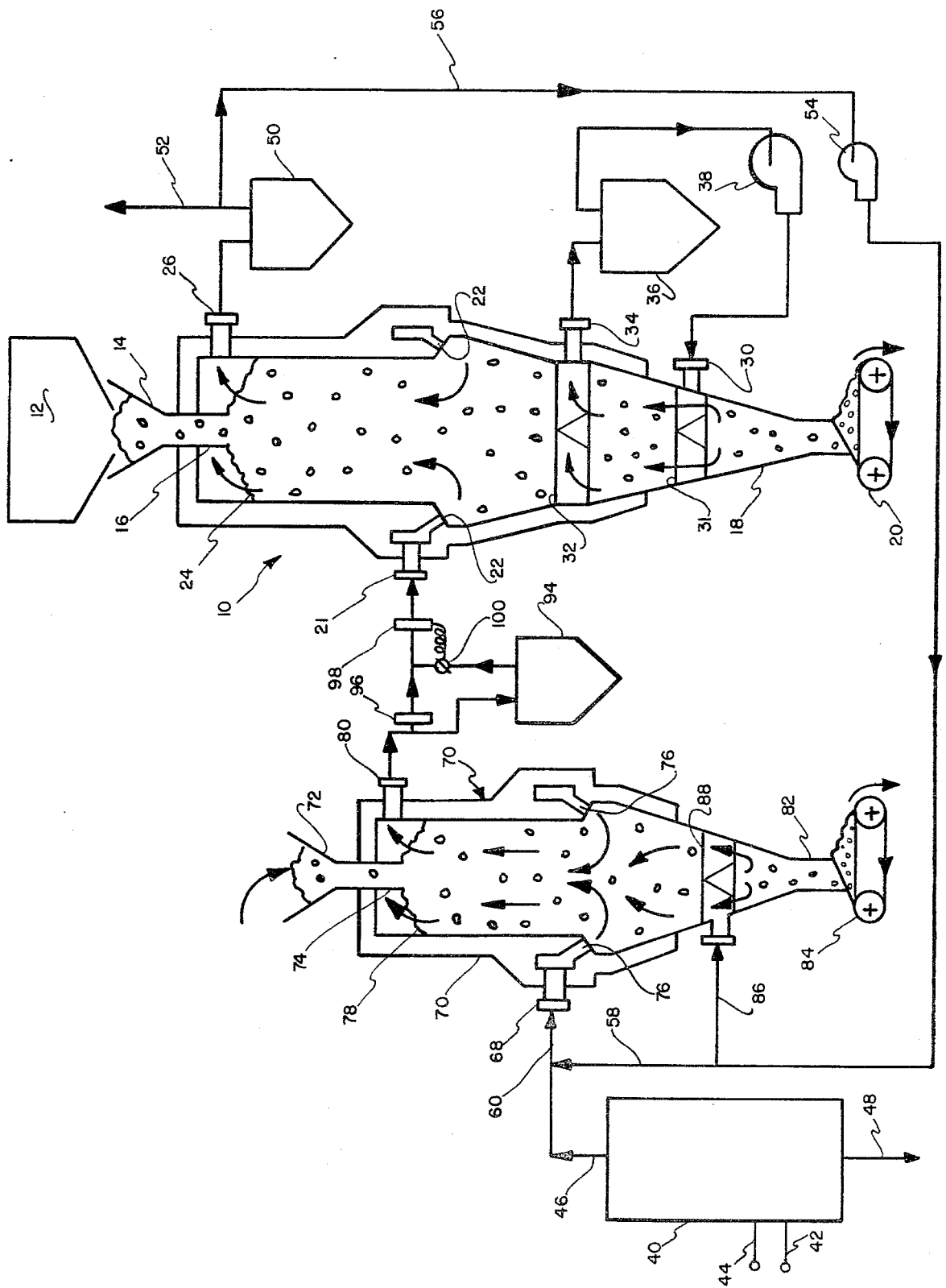

APPARATUS FOR THE DIRECT REDUCTION OF IRON AND PRODUCTION OF FUEL GAS USING GAS FROM COAL

CROSS REFERENCE TO RELATED APPLICATIONS

This application is a division of U.S. Patent Application Ser. No. 967,348, filed Dec. 7, 1978, which is a continuation in part of U.S. Patent Application Ser. No. 933,690, filed Aug. 15, 1978.

BACKGROUND OF THE INVENTION

The direct reduction of iron oxide, such as pellets or lump ore, to metallic iron in the solid state has in recent years become a commercial reality in many direct reduction plants throughout the world. The combined annual capacity of these plants currently in operation or under construction is in excess of 15 million metric tons of direct reduced iron product, which is used primarily for feedstock in electric arc steelmaking furnaces. The world demand for additional direct reduced iron is projected to increase at a substantial rate for many years to satisfy a growing world need for such feedstock, as additional electric arc furnace steelmaking plants are constructed.

The majority of the plants producing direct reduced iron utilize natural gas as the source of reductant. The natural gas is reformed to produce the reductants CO and $H_2$. A few plants utilize coal as the source of reductant in rotary kiln processes, such as the SL/RN process, which directly react coal in-situ in the kiln without separately gasifying the coal to CO and $H_2$. The rotary kiln processes have an inherent coal utilization inefficiency in that approximately two-thirds of the coal is burned in the kiln to supply heat and only one-third is used to supply the reducing gas for direct reduction. This inefficiency results in a coal requirement of 5.0 to 6.0 Gcals (Gigacalories) per metric ton of direct reduced iron produced. This is in contrast to 3.0 to 3.5 Gcals of natural gas required per metric ton of direct reduced iron produced in the more efficient natural gas processes such as the Midres, Purofer or Armoc process.

There are many processes, not yet commercialized, which gasify coal by partial oxidation with oxygen and steam to produce a gas which is then utilized in different manners in the direct reduction of iron. The principal reason none of these processes has been commercialized is either the process is too complex or impractical for commercialization, or the coal requirements are too high. The basic problem which leads to an impractical process or to a high total coal requirement is that the hot gas from the coal gasifier is too low in reductants (CO plus $H_2$) relative to oxidants ($CO_2$ plus $H_2O$ vapor) to be directly utilized efficiently in the direct reduction of iron.

In the present invention, the hot gas from the coal gasifier together with a minor portion of spent reducing gas from the reduction furnace are upgraded in reductants relative to oxidants by reaction with carbon and desulfurized by reaction with lime to produce a gas which can be used efficiently in the direct reduction of iron. The major portion of the spent reducing gas from the reduction furnace is cooled and scrubbed of dust, then becomes a source of clean low sulfur fuel gas to be utilized elsewhere. This combination of direct reduction of iron with fuel gas production has particular utility in an integrated steel plant which currently employs natural gas as fuel gas to supplement coke oven gas for reheating and heat treating operations. The direct reduced iron is used as feed for a BOF, or as part of the burden in a blast furnace to increase its hot metal output, or as feed for an electric arc furnace. The fuel gas produced can replace all or part of the natural gas currently used as fuel in the steel plant.

The present invention requires approximately 5.6 Gcals of coal to be gasified plus 0.33 Gcals of carbon reacted plus 0.74 Gcals of coal to produce electricity for gasification oxygen, to produce one metric ton of direct reduced iron while producing 3.23 Gcals of clean fuel gas. The Gcals consumed in producing one metric ton of direct reduced iron are therefore, 3.4, as tabulated hereinafter.

OBJECTS OF THE INVENTION

It is the primary object of this invention to provide a practical and thermally efficient process for utilizing coal as the source of gaseous reductant in the direct reduction of iron.

It is also an object of this invention to provide an efficient method of directly utilizing hot gas from a coal gasifier in the direct reduction of iron by upgrading the reducing potential of the gasifier gas by reaction with carbon.

It is another object of the invention to provide a method for desulfurizing hot gas for a coal gasifier by reaction with sulfur acceptor such as lime.

It is a further object of the invention to produce simultaneously direct reduced iron and clean fuel gas from coal.

BRIEF DESCRIPTION OF THE DRAWING

The single FIGURE is a diagrammatic illustration of the preferred embodiment of the present invention.

DETAILED DESCRIPTION

A refractory lined counterflow shaft type direct reduction furnace is indicated generally in the drawing as 10. Iron oxide feed material 12, in the form of oxide pellets and/or natural lump ore of a nominal particle size in the range of 5 to 30 mm, is fed to a feed hopper 14 and into the furnace through a feed pipe 16 to establish a burden within the furnace. Reduced iron pellet and/or lump product is withdrawn from the lower region of the furnace through a furnace discharge pipe 18 by a discharge conveyor 20, the speed of which controls the rate of descent of the burden through furnace 10.

Fresh hot reducing gas is introduced to furnace 10 through a hot reducing gas inlet pipe 21 and then through a plurality of gas inlet ports 22 arranged in the refractory wall in the middle region of the furnace. The hot reducing gas flows inwardly, then upwardly in counterflow relationship to the descending burden. $CO_2$-rich spent reducing gas exits the burden near the top of the furnace at stockline 24 formed by the angle of repose of the feed from the oxide feed pipe 16. The $CO_2$-rich spent reducing gas, hereafter called top gas, exits the furnace through an offtake pipe 26.

The lower region of furnace 10 is provided with a cooling gas circuit for cooling the reduced iron prior to discharge. This cooling circuit includes a cooling gas inlet 30 leading to a cooling gas distributing member 31 within furnace 10, a cooling gas collecting member 32 positioned above the distributing member within the furnace, a cooling gas outlet 34, and an external gas recirculating system having a cooler-scrubber 36 and a recirculating blower 38.

A fossil fuel gasifier 40, utilizing oxygen or oxygen and $H_2O$ admitted through an injector 42 is used to gasify a fossil fuel such as coal, lignite or char admitted through a fuel injector 44, in order to produce a heat gasifier gas which leaves the gasifier through pipe 46. Residual ash from the gasification of the fuel is withdrawn from the gasifier 40 through an ash discharge 48.

Top gas leaving furnace 10 through offtake pipe 26 is cooled and scrubbed of dust in a cooler-scrubber 50. The major portion of the gas leaving cooler-scrubber 50 is removed from the system as clean export fuel gas product through pipe 52. A minor portion of the gas leaving cooler-scrubber 50 is piped to a compressor 54 through pipe 56. From compressor 54 the gas goes to an after-cooler, not shown, to condense out water vapor and then a portion of the gas is utilized through pipe 58 to temper the hot gasifier gas in pipe 46 to form a tempered mixture in pipe 60. This tempering gas in pipe 58 could alternately be introduced to the gas discharge region of the gasifier 40 where it would have no significant adverse effect on the gasification temperature.

The hot gasifier gas in pipe 46, after being mixed with and partially cooled by tempering gas from pipe 58 is admitted to a gas reactor 70 through a gas inlet pipe 68. Reactor 70 is a refractory-lined counterflow shaft type reactor into the top of which particulate limestone and particulate carbonaceous material such as coke or coal char are introduced through feed hopper 72 and reactor feed pipe 74 to form a burden in the reactor. The tempered hot gasifier gas from gas inlet pipe 68 is introduced into the reactor through gas inlet ports 76 arranged in the refractory wall in the middle region of the reactor. This gas flows inwardly through the burden then upwardly in counterflow relationship to the descending burden. Reacted gas exits from the burden at a stockline 78. The reacted gas exits the reactor through an offtake pipe 80. Particulate reacted lime, containing sulfur, and any residual unreacted lime and carbonaceous material are withdrawn from the reactor through a reactor discharge pipe 82 by a discharge conveyor 84. Removal of the particulate material via pipe 82 establishes a gravitational burden flow and controls the rate of descent of the burden through reactor 70. A small portion of top gas from compressor 54 is introduced through pipe 86 to a cooling gas distributing member 88 in the lower region of reactor 70 as cooling gas to cool the burden prior to discharge. This cooling gas flows upwardly through the reactor, is preheated by the hot descending burden before the gas reaches the middle or gas upgrading region of the reactor, and becomes mixed with the tempered gasifier gas.

Hot reacted gas leaving reactor 70 via outlet 80 is piped to the reduction furnace reducing gas inlet 21 through pipe 92. The hot reacted gas leaving outlet 80 will normally be at a higher temperature than is desired for introduction to gas inlet 21. In order to independently control the temperature of the gas at inlet 21, a gas cooler 94 is provided to cool a side stream of gas from outlet 80. This side stream cooling circuit includes a fixed orifice 96 in pipe 92 to cause a portion of the gas to flow through cooler 94. A gas temperature sensor 98 acts to control the action of a cooler gas flow valve 100 in order to maintain the desired gas temperature at inlet 21.

In the direct reduction of iron, the type of reduction furnace having the highest thermal efficiency is a counterflow shaft type furnace in which the reducing gas and solids being reduced move in counterflow relationship to each other. With such relationship the hot reducing gas serves not only to reduce the iron oxide to metallic iron but also to heat the incoming cold iron oxide feed to reducing temperature.

A counterflow shaft type furnace also has the highest chemical efficiency of any type of reduction furnace, provided that the hot reducing gas admitted to the furnace is of high enough quality. Reducing gas quality is commonly expressed as the ratio of reductants (CO plus $H_2$) to oxidants ($CO_2$ plus $H_2O$) in the gas mixture. Commercial operation experience with natural gas based plants has shown that in order to take full advantage of the inherent chemical efficiency of a counterflow shaft reduction furnace, the quality of the hot reducing gas should be at least about 8.

In the gasification of pulverized solid fossil fuels such as coal or lignite in a partial oxidation type gasifier such as gasifier 40, which produces a hot gasifier gas containing principally CO, $H_2$, $CO_2$ and $H_2O$, the highest quality hot gas that is practical to be produced commercially is in the range of about 3 to 4. However, process development and demonstration coal gasifiers are now being constructed which have a goal of producing a better quality hot gas of at least about 6 through improved gasification technology. The present invention provides a method for upgrading the quality of the hot gasifier gas without cooling the gas below the temperature at which it will be introduced to the reduction furnace.

The following description of the operation of the present invention is based on gasifying a typical Western U.S.A. subbituminous coal using oxygen, $H_2O$ and pulverized coal in an entrained-bed type gasifier, which will produce hot gas containing principally CO, $H_2$, $CO_2$ and $H_2O$. The gasification temperature in such gasifier is generally about 1400 C. At this temperature the coal ash becomes liquid, is water quenched and removed from the bottom region of the gasifier as slag.

As a specific example of the present invention, and with reference to the drawing, hot reducing gas having a quality of 8.0 and at a temperature of 815 C. is introduced to reduction furnace 10 via gas inlet 21. The hot gas distributes across the burden in the furnace and then flows upwardly counter to the descending iron oxide burden. CO and $H_2$ in the gas react with the iron oxide to produce $CO_2$ and $H_2O$ and metallic iron by the well-known reduction reactions. Because of the chemical thermodynamics involved in the reduction of iron oxide to metallic iron, only a portion of the initial reductants (CO plus $H_2$) can be reacted before the oxidants ($CO_2$ and $H_2O$) which are formed cause reduction reactions to cease. This thermodynamic situation results in the spent reducing gas, or top gas, leaving the furnace at offtake pipe 26, having a quality of 1.6. In gas cooler-scrubber 50, much water vapor is condensed and removed from the gas resulting in cooled top gas having a quality of 1.9. This quality gas is a good fuel gas for burning, but it is essentially a neutral gas having no reducing potential for direct reduction of iron.

The major portion of the 1.9 quality top gas is exported from the facility as fuel gas.

The hot gasifier gas leaving coal gasifier 40 in pipe 46 is at a temperature of 1370 C. and has a quality of 6.5. The gas contains $H_2S$ and COS from sulfur in the coal, some unreacted coal char and some liquid droplets of ash carryover. To solidify the liquid droplets of ash in the hot gasifier gas to enable it to be transported in pipes, a tempering stream 58 of cool top gas is mixed with the hot gas to give a mixture temperature of 1180 C. at reactor 70 gas inlet pipe 68. This tempering with cooled top gas results in a mixture gas quality of 5.3 at gas inlet pipe 68.

Reactor 70 is fed a mixture of particulate carbonaceous material such as coke or anthracite type coal or coal char, hereinafter referred to as carbon, and particulate limestone. The particle size is preferably in a range of about 3 to 20 mm in order to have a reactor burden with good gas permeability. The mass flow rate of hot gas admitted to the reactor 70 is very high relative to the mass flow of cold limestone and carbon fed to the reactor. This results in the limestone and carbon being very rapidly heated to gas temperature when still at an elevation just below the stockline 78. This causes the limestone to be very rapidly calcined to burned lime (CaO) which is the proper form of lime for reaction with $H_2S$ and COS and removal of these constituents from the gasifier gas.

In the lower portion of the reaction zone in reactor 70, where the hot gas is introduced to the burden, oxidants ($CO_2$ plus $H_2O$) in the gas are reacted with carbon in the reactor burden to form reductants (CO plus $H_2$) by the well known reactions:

$$CO_2 + C = 2\ CO$$

and $$H_2O + C = CO + H_2$$

These reactions proceed at a useful practical rate as long as the temperature exceeds about 950 C. These reactions are endothermic which results in the cooling of the hot gas from the admission temperature of 1180 C. down to 950 C. The sensible heat made available in this 230 C. cooling of the gas will react enough carbon to upgrade the quality of the hot gas from 6.5, as admitted to the reactor to 8.0 in the lower portion of the reaction zone. This initial reaction with carbon results in the middle portion of the reaction zone operating at a temperature of about 950 C. which is a very favorable temperature for the well known reactions of $H_2S$ and COS with lime:

$$H_2S + CaO = CaS + H_2O$$

and $$COS + CaO = CaS + CO_2$$

The lowering of the oxidant ($CO_2$ plus $H_2O$) content in the hot gas by reaction with carbon also favors $H_2S$ and COS removal. The sulfur content of the hot gasifier gas for the particular coal selected is about 3900 parts per million volume (ppmv) as $H_2S$ plus COS. At the 950 C. reaction temperature and with the lowered $CO_2$ plus $H_2O$ content after reaction with carbon, the sulfur content of the gas leaving the reactor is about 110 ppmv. This level of sulfur is below the maximum that can be tolerated in the direct reduction of iron. The amount of limestone required will depend on the sulfur content of the coal. The amount of $CO_2$ plus $H_2O$ formed in the reaction by the reaction of sulfur with lime is only a small fraction of the total gas volume and will have a minor effect on the quality of the reacted gas leaving the reactor at outlet 80. The $CO_2$ released in the reactor by the calcining of the limestone to burned lime also has only minor effect on the gas quality. Both of these minor additions of $CO_2$ plus $H_2O$ are included in the tabulations hereinafter shown.

In reactor 70, the hot burden leaving the reaction zone is cooled before discharge by admitting a relatively small flow cooled top gas from pipe 86 to cooling gas distributing member 88. This cooling gas flows upwardly and is forced toward the center of the reaction zone by the incoming gas from ports 76 after being preheated by the hot descending burden in the cooling zone, and is upgraded in quality by reaction with carbon.

In the example, the reacted gas exiting reactor 70 through gas outlet 80 is at a temperature of 888 C., after having heated the incoming cold limestone and carbon feed and calcining the limestone to burned lime. This 888 C. reacted gas is cooled to about 815 C. by the by-pass cooling system including gas cooler 94.

In the by-pass cooling system, a gas pressure drop is created in pipe 92 by providing a fixed orifice 96 having a smaller cross-sectioned area than that of pipe 92. This forces a portion of the hot gas to flow through gas cooler 94 and cooler gas flow valve 100, thereby cooling that portion of the hot gas which by-passes the orifice 96 through the by-pass cooling system. The gas temperature sensor 90 acts through a conventional controller, not shown, to position valve 100 to admit the proper amount of cooled gas to pipe 92 to maintain the desired gas temperature at sensor 90 and at furnace gas inlet 21. A principal advantage of this by-pass cooling is that it does not affect the quality of the gas. For example, an alternative cooling means such as gas tempering in pipe 92 with cooled top gas from compressor 54 would act to reduce the quality of the gas at inlet 21, which in the present invention would be undesirable.

The following tables give a comprehensive process analysis of the invented process and are keyed to the drawing. These data are to be understood as being merely illustrative and in no way limiting. All of the tabulations are based on one metric ton of direct reduced iron produced, having a degree of metallization of 92 percent and a carbon content of 1.5 percent. These are widely accepted commercial standards for direct reduced iron made in natural gas based direct reduction plants.

Table I shows the gas flow rates and gas quality (reductant to oxidant ratio) at the locations indicated with reference to the drawing.

TABLE I

| | GAS FLOWS | | |
|---|---|---|---|
| Item | Flow Sheet Number | Flow In *nm3 | Gas Quality |
| Gasifier Gas | 46 | 1684 | 6.5 |
| Temper Gas | 58 | 286 | 2.2 |
| Gas Mixture into Reactor | 68 | 1970 | 5.3 |
| Gas Leaving Reactor | 80 | 2114 | 8.0 |
| Reducing Gas | 21 | 2114 | 8.0 |
| Spent Reducing Gas | 26 | 2102 | 1.6 |
| Cooled Top Gas Recycle | 56 | 312 | 1.9 |
| Cooled Top Gas Export Fuel | 52 | 1649 | 1.9 |

TABLE I-continued

| | GAS FLOWS | | |
|---|---|---|---|
| Item | Flow Sheet Number | Flow In *nm3 | Gas Quality |
| Reactor Cooling gas | 86 | 26 | 2.2 |

*Normal Cubic Meters
Note:
Spent Gas flow at outlet 26 is less than reducing gas flow at reducing gas inlet 21 because 1.5% carbon is added to the direct reduced iron by reaction with the CO from the reducing gas.

Table II shows the feed requirements for the coal gasifier 40.

TABLE II

| COAL GASIFIER | |
|---|---|
| Dry Coal (kg) | 882 |
| $H_2O$ (kg) | 168 |
| Oxygen ($nm^3$ of 98% $O_2$) | 425 |

Table III shows the feed requirements and the outputs of reactor 70.

TABLE III

| REACTOR (all units are kg) | |
|---|---|
| Limestone in | 59.0 |
| CaO out | 16.5 |
| CaS out | 21.2 |
| Carbon from gasifier | 29.0 |
| External carbon fed | 41.5 |
| Total carbon reacted | 56.4 |
| Unreacted carbon out | 14.1 |

Table IV shows the approximate energy requirements for the invented process.

TABLE IV

| ENERGY | |
|---|---|
| Gasifier Coal | 5.6 Gcal |
| Reactor Carbon fed | 0.33 Gcal |
| Oxygen Plant Coal | *0.74 Gcal |
| Total | 6.67 Gcal |
| Cooled Top Gas Export Fuel | 3.23 Gcal |
| Consumed for reduction | 3.4 Gcal |

*Approximately 258 kWh at 30% conversion efficiency

Table V shows the gas temperatures at the indicated locations in the process.

TABLE V

| | GAS TEMPERATURES | |
|---|---|---|
| Item | Flow Sheet Number | Temperature Degrees C. |
| Out Gasifier | 46 | 1370 |
| To reactor | 68 | 1180 |
| After Carbon Reaction | 70(in reactor) | 950 |
| Out Reactor | 80 | 888 |

TABLE V-continued

| | GAS TEMPERATURES | |
|---|---|---|
| Item | Flow Sheet Number | Temperature Degrees C. |
| Reducing Gas | 21 | 815 |

Table VI shows the gas analyses at the indicated locations in the process.

TABLE VI

| | GAS ANALYSIS | | | | | | | |
|---|---|---|---|---|---|---|---|---|
| Item | Flow Sheet Number | % CO | % $CO_2$ | % $H_2$ | % $H_2O$ | % $CH_4$ | % $N_2$ | ppmv ($H_2S$ COS) |
| Gasifier Gas | 46 | 55.5 | 5.5 | 30.0 | 7.7 | 0.1 | 0.9 | 3900 |
| To Reactor | 68 | 53.5 | 8.9 | 29.4 | 6.8 | 0.1 | 1.0 | 3400 |
| Reducing Gas | 80 & 21 | 58.1 | 6.4 | 29.8 | 4.6 | 0.1 | 1.0 | 110 |
| Spent Red. gas | 26 | 37.4 | 26.1 | 22.9 | 11.7 | 0.1 | 1.8 | 0 |
| Cooled Top Gas | 56 | 39.8 | 27.8 | 24.4 | 6.0 | 0.1 | 1.9 | 0 |
| Temper Gas | 58 | 41.6 | 29.0 | 25.4 | 2.0 | 0.1 | 2.0 | 0 |
| Export Fuel | 52 | 39.8 | 27.8 | 24.4 | 6.0 | 0.1 | 1.9 | 0 |

Although a counterflow type shaft reactor has been described for upgrading the quality and for desulfurizing the gas in reactor 70, it will be understood that this gas upgrading and desulfurizing can be accomplished in process apparatus other than a shaft reactor, such as a fluidized bed of carbon and lime particles, without departing from the basic concept of the present invention. The desulfurizing agent fed to the reactor may be burnt lime or another suitable sulfur acceptor such as manganese oxide. Further, as an alternative to adding carbon from an external source to the reactor, the coal gasifier may be operated to achieve sufficient carbon carryover to satisfy the carbon reaction requirement in the reactor.

It can readily be seen from the foregoing that we have provided an energy efficient, useful and practical apparatus for achieving direct reduction of iron utilizing coal gasifier gas as the source of reductant for the direct reduction, and for simultaneously producing a clean fuel gas for export from the facility.

We claim:

1. Apparatus for the direct reduction of iron oxide and production of fuel gas comprising:
   a. a fossil fuel gasifier for producing a gasifier gas;
   b. a generally vertically shaft type reactor having means at its upper end for introducing a particulate burden thereto and means for removing particulate material therefrom at its lower end, means intermediate said burden introducing and removal means for introducing gas from said gasifier to the burden in said reactor and means for removing treated gas from said reactor above said burden;
   c. conduit means communicating with said gasifier and said reactor for conducting said gasifier gas to said reactor;
   d. a generally vertical shaft furnace for the direct reduction of iron, having particle introducing means at the top thereof, particle removal means at the bottom thereof for establishing a descending burden therein, treated gas introduction means between said particle introducing means and said particle removal means and means for removing a spent reducing gas from the top of said furnace;
   e. conduit means communicating with said reactor and said furnace;

f. means associated with said conduit for separating said treated gas from said reactor into two streams;

g. means for cooling one of said streams;

h. temperature responsive valve means for introducing said cooler stream to the hotter stream in said conduit between said reactor and said furnace;

i. means communicating with said spent gas removal means for cooling and scrubbing said removed spent reducing gas;

j. means for dividing the cleaned, cooled spent reducing gas into a first gas stream for use as a fuel gas and a second gas stream for use as a tempering gas; and k. conduit means for conducting said second stream to said reactor.

2. Apparatus according to claim 1 wherein said means for separating said treated gas into two streams is a plate having a fixed orifice therein.

3. Apparatus according to claim 1 further comprising means for introducing a portion of said cleaned, cooled spent reducing gas into said reactor at the particle discharge region to cool the burden therein.

4. Apparatus according to claim 1 wherein said conduit for conducting said second stream to said reactor communicates with said conduit between said gasifier and said reactor.

* * * * *